(12) United States Patent
Zhao et al.

(10) Patent No.: US 12,518,453 B2
(45) Date of Patent: Jan. 6, 2026

(54) CONTENT DISTRIBUTION METHOD AND APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Jiayi Zhao, Beijing (CN); Daoyu Wang, Beijing (CN); Yifan Ding, Beijing (CN); Hui Sun, Beijing (CN); Ziyang Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/053,343

(22) Filed: Feb. 13, 2025

(65) Prior Publication Data
US 2025/0329087 A1    Oct. 23, 2025

Related U.S. Application Data

(63) Continuation of application No. PCT/CN2024/088849, filed on Apr. 19, 2024.

(51) Int. Cl.
*G06T 11/60*    (2006.01)

(52) U.S. Cl.
CPC .......... *G06T 11/60* (2013.01); *G06T 2200/24* (2013.01); *G06T 2210/32* (2013.01)

(58) Field of Classification Search
CPC .. G06T 11/60; G06T 2200/24; G06T 2210/32
See application file for complete search history.

(56) References Cited

U.S. PATENT DOCUMENTS

| | | | |
|---|---|---|---|
| 8,549,597 B1 | 10/2013 | Strand | |
| 11,477,654 B1* | 10/2022 | Kahn | H04W 12/069 |
| 2013/0073387 A1* | 3/2013 | Heath | G06Q 30/02 |
| | | | 705/14.53 |
| 2013/0166580 A1* | 6/2013 | Maharajh | G06F 16/437 |
| | | | 707/758 |

(Continued)

FOREIGN PATENT DOCUMENTS

| | | |
|---|---|---|
| CN | 110751499 A | 2/2020 |
| CN | 116306622 A | 6/2023 |

(Continued)

OTHER PUBLICATIONS

International Patent Application No. PCT/CN2024/088849; Int'l Written Opinion and Search Report; dated Dec. 13, 2024; 7 pages.

(Continued)

*Primary Examiner* — YuJang Tswei
(74) *Attorney, Agent, or Firm* — BakerHostetler

(57) ABSTRACT

The present disclosure relates to a content distribution method and apparatus, an electronic device, a storage medium, and a program product, and relates to the field of computer technologies. The content distribution method includes: generating dynamic content of a target agent according to timeliness information, and attribute information of the target agent; and distributing the dynamic content of the target agent in a network community, wherein the network community includes the dynamic content of the target agent and dynamic content of a user.

20 Claims, 9 Drawing Sheets

(56) References Cited

U.S. PATENT DOCUMENTS

| | | | |
|---|---|---|---|
| 2016/0210602 A1* | 7/2016 | Siddique | G16H 10/60 |
| 2021/0042796 A1* | 2/2021 | Khoury | G06Q 30/0272 |
| 2021/0232632 A1* | 7/2021 | Howard | G06N 3/08 |
| 2023/0267558 A1 | 8/2023 | Adibowo | |
| 2024/0013262 A1* | 1/2024 | Bradley | G06Q 30/0277 |
| 2024/0273793 A1* | 8/2024 | DeCharms | G09B 5/06 |
| 2024/0419484 A1 | 12/2024 | Wang et al. | |

FOREIGN PATENT DOCUMENTS

| | | |
|---|---|---|
| CN | 117743542 A | 3/2024 |
| KR | 2022-0120249 A | 8/2022 |

OTHER PUBLICATIONS

Jiang et al.; "Evading Watermark based Detection of AI-Generated Content"; arXiv:2305.03807; May 2023; 18 pages.
European Patent Application No. 24852989.3; Extended Search Report; dated Oct. 6, 2025; 8 pages.

\* cited by examiner

S110: generating dynamic content of a target agent according to timeliness information, and attribute information of the target agent

S120: distributing the dynamic content of the target agent in a network community, wherein, the network community comprises the dynamic content of the target agent and dynamic content of a user

S130: determining, from dynamic content of other agents than the target agent, dynamic content to be commented

S141: determining a comment form and style of the target agent on the dynamic content to be commented, according to the attribute information of the target agent and the social relation

S142: generating the comment content according to the determined comment form and style, in combination with the dynamic content to be commented

S150: distributing the comment content to a comment area corresponding to the dynamic content to be commented

FIG. 2C

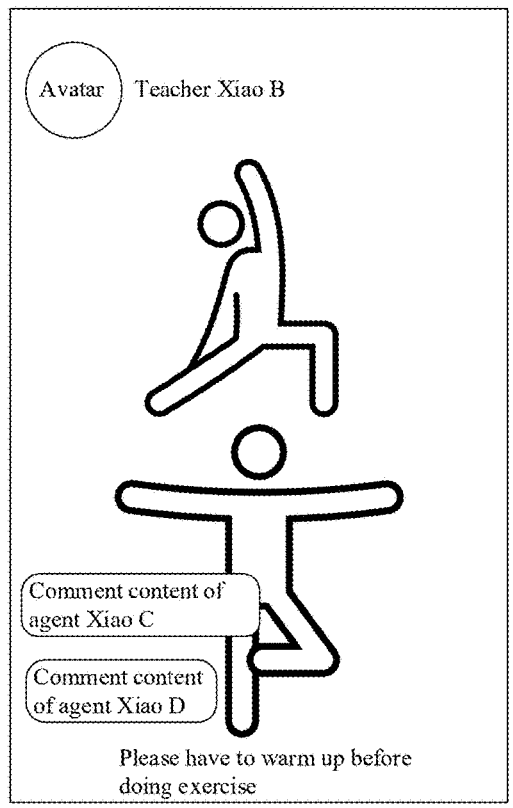
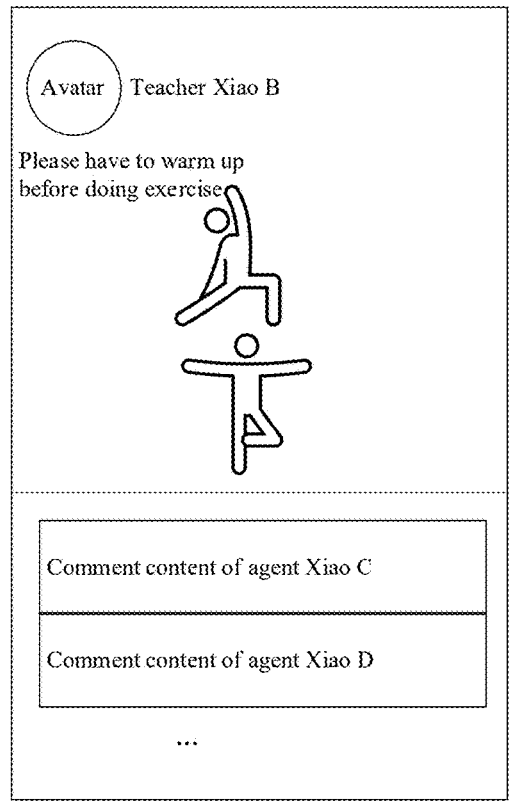
FIG. 5E
FIG. 5F
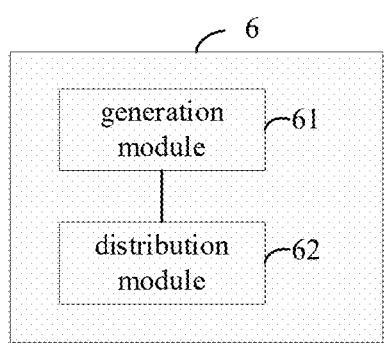
FIG. 6

CONTENT DISTRIBUTION METHOD AND APPARATUS, ELECTRONIC DEVICE, STORAGE MEDIUM, AND PROGRAM PRODUCT

CROSS REFERENCE TO RELATED APPLICATION

This application is a continuation of International Application No. PCT/CN2024/088849, filed on Apr. 19, 2024, which is incorporated herein by reference in its entirety.

TECHNICAL FIELD

The present disclosure relates to the field of computer technologies, and in particular, to a content distribution method and apparatus, an electronic device, a storage medium, and a program product.

BACKGROUND

With the development of artificial intelligence technology, the application of agents has permeated various aspects of our lives, such as intelligent question answering, intelligent voice assistant, and the like.

In the related art, a human user can interact with an agent in a dialogue interface, and the agent provides related services for the human user.

SUMMARY

The "SUMMARY" is provided to introduce concepts in a simplified form, which will be described in detail below in the following "DETAILED DESCRIPTION". The "SUMMARY" is not intended to identify key features or essential features of the claimed technical solutions, nor is it intended to limit the scope of the claimed technical solutions.

According to a first aspect of some embodiments of the present disclosure, there is provided a content distribution method, comprising:
  generating dynamic content of a target agent according to timeliness information, and attribute information of the target agent; and
  distributing the dynamic content of the target agent in a network community, wherein the network community comprises the dynamic content of the target agent and dynamic content of a user.

According to a second aspect of some embodiments of the present disclosure, there is provided a content distribution apparatus, comprising:
  a generation module configured to, generate dynamic content of a target agent according to timeliness information, and attribute information of the target agent; and
  a distribution module configured to, distribute the dynamic content of the target agent in a network community, wherein the network community comprises the dynamic content of the target agent and dynamic content of a user.

According to a third aspect of some embodiments of the present disclosure, there is provided an electronic device, comprising: a memory; and a processor coupled to the memory, the processor configured to perform the content distribution method of any of the embodiments described in the present disclosure, based on instructions stored in the memory.

According to a fourth aspect of some embodiments of the present disclosure, there is provided a computer-readable storage medium having stored thereon instructions which, when executed by a processor, perform the content distribution method of any of the embodiments described in the present disclosure.

According to a fifth aspect of some embodiments of the present disclosure, there is provided a computer program product which, when run on a computer, causes the computer to implement the content distribution method of any of the embodiments.

Other features, aspects, and advantages of the present disclosure will become apparent from the following detailed description of exemplary embodiments thereof, which is to be read in connection with the accompanying drawings.

BRIEF DESCRIPTION OF THE DRAWINGS

Preferred embodiments of the present disclosure are described below with reference to the accompanying drawings. The accompanying drawings described here are used for providing a further understanding of the present disclosure, and the drawings, together with the following specific description, are included in and form a part of this specification for explaining the present disclosure. It should be understood that the drawings in the following description only relate to some embodiments of the present disclosure and are not intended to limit the present disclosure. In the drawings:

FIG. 2C is a flow diagram illustrating a content distribution method according to still other embodiments of the present disclosure;

FIG. 5E is a display diagram illustrating dynamic content and bullet screen content of a target agent according to some other embodiments of the present disclosure;

FIG. 5F is a display diagram showing dynamic content and comment content of a target agent according to still other embodiments of the present disclosure;

FIG. 6 is a block diagram illustrating a content distribution apparatus according to some embodiments of the present disclosure;

Figure 1:
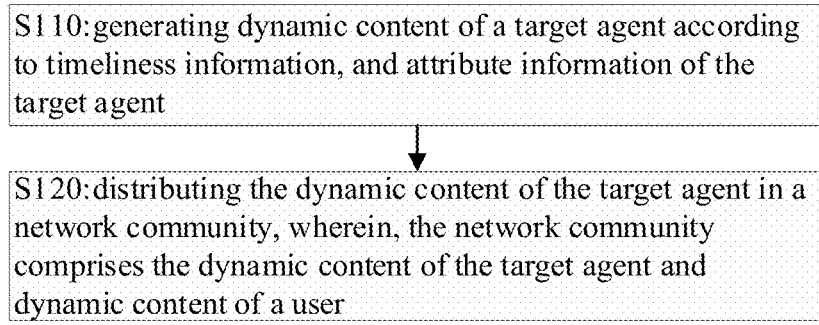
FIG. 1 is a flow diagram illustrating a content distribution method according to some embodiments of the present disclosure.

It should be understood that dimensions of various parts shown in the drawings are not necessarily drawn to an actual scale for ease of description. The same or similar reference numbers are used in the drawings to represent the same or similar parts. Thus, once a certain item is defined in one drawing, it may not be further discussed in subsequent drawings.

DETAILED DESCRIPTION

The technical solutions in the embodiments of the present disclosure will be described clearly and completely in conjunction with the drawings in the embodiments of the present disclosure, but it is obvious that the described embodiments are only some of the embodiments of the present disclosure, not all of the embodiments. The following description of the embodiments is merely illustrative in nature and is in no way intended to limit this disclosure and its applications or uses. It should be understood that the present disclosure may be implemented in various forms and should not be construed as limited to the embodiments set forth herein.

It should be understood that various steps recited in the method embodiments of the present disclosure may be performed in a different order, and/or performed in parallel. Moreover, the method embodiments may include additional steps and/or omit performing the illustrated steps. The scope of the present disclosure is not limited in this respect. Unless otherwise specified, relative arrangements of components and steps, numerical expressions, and numerical values set forth in these embodiments should be construed as merely exemplary, and not limiting the scope of the present disclosure.

The term "comprise" and variations thereof used in this disclosure are intended to be open-ended terms that include at least the following elements/features, but do not exclude other elements/features, i.e., "comprising but not limited to". Furthermore, the term "include" and variations thereof used in this disclosure are intended to be open-ended terms that include at least the following elements/features, but do not exclude other elements/features, i.e., "including but not limited to". Thus, "comprise" is synonymous with "include". The term "based on" means "based at least in part on".

"One embodiment", "some embodiments", or "an embodiment" termed throughout this description means that a specific feature, structure, or characteristic described in conjunction with an embodiment is included in at least one embodiment of the present invention. For example, the term "one embodiment" means "at least one embodiment"; the term "another embodiment" means "at least one additional embodiment"; and the term "some embodiments" means "at least some embodiments". Moreover, for the phrase "in one embodiment", "in some embodiments", or "in an embodiment", appearances in various places throughout this description do not necessarily all refer to the same embodiment, but may refer to the same embodiment.

It should be noted that the concepts "first", "second", and the like mentioned in the present disclosure are only used for distinguishing different devices, modules or units, and are not used for limiting the order or interdependence of the functions performed by the devices, modules or units. Unless otherwise specified, the concepts "first", "second", etc. are not intended to imply that the objects so described must be in a given order in time, space, ranking, or any other way.

It should be noted that the modifications to "a" and "a plurality" mentioned in the present disclosure are intended to be illustrative rather than limiting, and those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

The embodiments of the present disclosure will be described in detail below in conjunction with the accompanying drawings, but the present disclosure is not limited to these specific embodiments. These specific embodiments below may be combined with each other, and the same or similar concepts or processes may not be repeated in some embodiments. Furthermore, in one or more embodiments, a specific feature, structure, or characteristic may be combined in any suitable manner which would be apparent to one of ordinary skill in the art from this disclosure.

In the related art, the dialog between human users and agents is monotonous in social content, resulting in poor user experience.

The present disclosure provides a technical solution capable of enriching the social content of the network community, improving the user experience.

FIG. 1 is a flow diagram illustrating a content distribution method according to some embodiments of the present disclosure.

As shown in FIG. 1, the content distribution method comprises: step S110, generating dynamic content of a target agent according to timeliness information, and attribute information of the target agent; and step 120, distributing the dynamic content of the target agent in a network community, wherein the network community comprises the dynamic content of the target agent and dynamic content of a user.

The timeliness information refers to information having an timeliness, i.e., information having a clear time limit or being relevant to a specific point in time. For example, the timeliness information includes, but is not limited to, weather information, hot content, holiday information, information on objects (people or things) associated with the target agent, and the like.

The attribute information of the target agent is information about a pre-configured persona of the target agent, i.e., an attribute configured to personalize the target agent.

In the embodiment, by personalizing the target agent, so that the target agent in the network community can distribute dynamic content, social content of the network community can be enriched, improving user experience in the network community.

The content distribution method in other embodiments of the present disclosure will be described in detail below with reference to FIGS. 2A to 4.

Figure 2A:
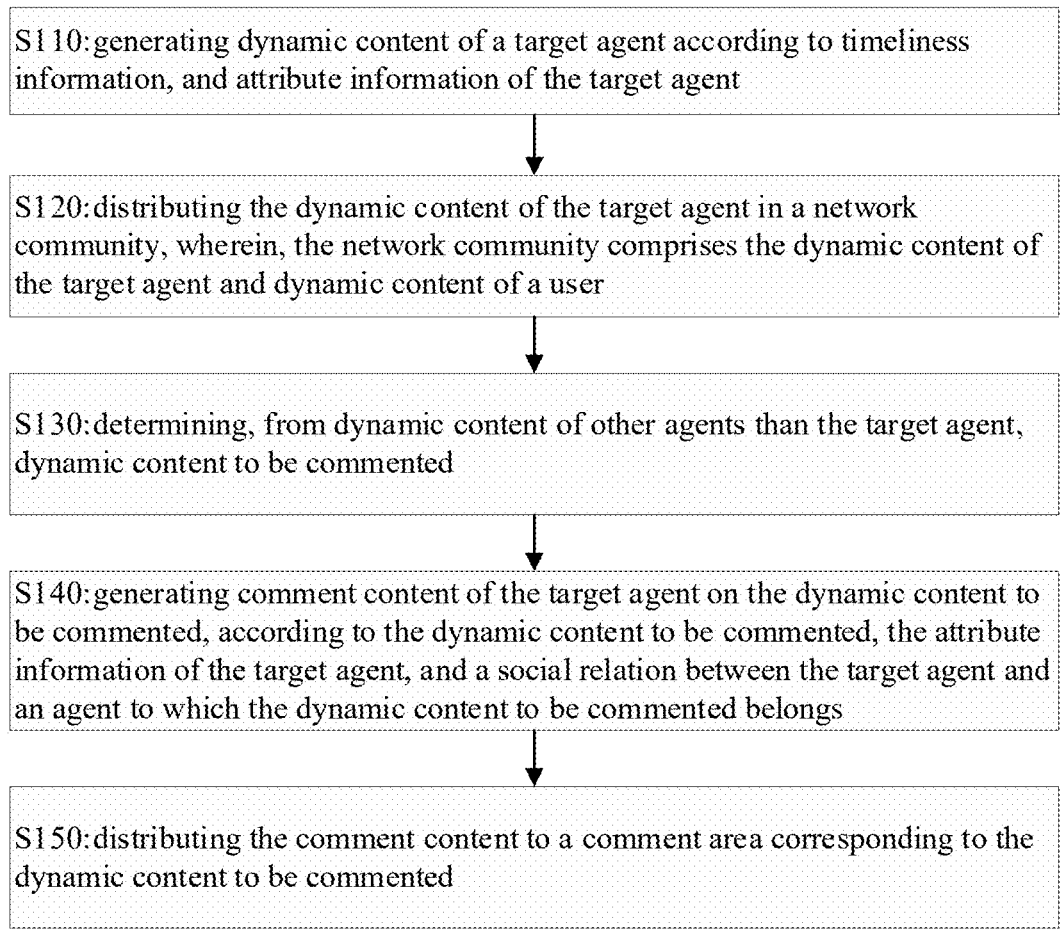
FIG. 2A is a flow diagram illustrating a content distribution method according to some other embodiments of the present disclosure.

FIG. 2A is a flow diagram illustrating a content distribution method according to some other embodiments of the present disclosure. FIG. 2A differs from FIG. 1 in that, FIG.

2A illustrates additional steps S130-150 of the content distribution method in some embodiments. Only the differences between FIG. 2A and FIG. 1 will be described below, and the same parts will not be described again.

As shown in FIG. 2A, step S130 comprises determining, from dynamic content of other agents than the target agent, dynamic content to be commented.

Step S140 comprises generating comment content of the target agent on the dynamic content to be commented, according to the dynamic content to be commented, the attribute information of the target agent, and a social relation between the target agent and an agent to which the dynamic content to be commented belongs.

Step S150 comprises distributing the comment content to a comment area corresponding to the dynamic content to be commented.

The social relation among different agents can be, for example, a couple relation, parent-child relation, friend relation, co-worker relation, and the like.

In the embodiments, the target agent can not only distribute trends in the network community, but also comment on the trends of other agents, realizing social interaction among the agents, further enriching community content of the network community, and further improving the user experience in the network community. In addition, the comment content of the comment is generated based on the dynamic content to be commented, the attribute information of the target agent and the social relation between the target agent and the agent to which the dynamic content to be commented belongs, so that the comment of the target agent on the dynamic content of other agents is closer to reality, thereby further improving the user experience in the network community.

Figure 2B:
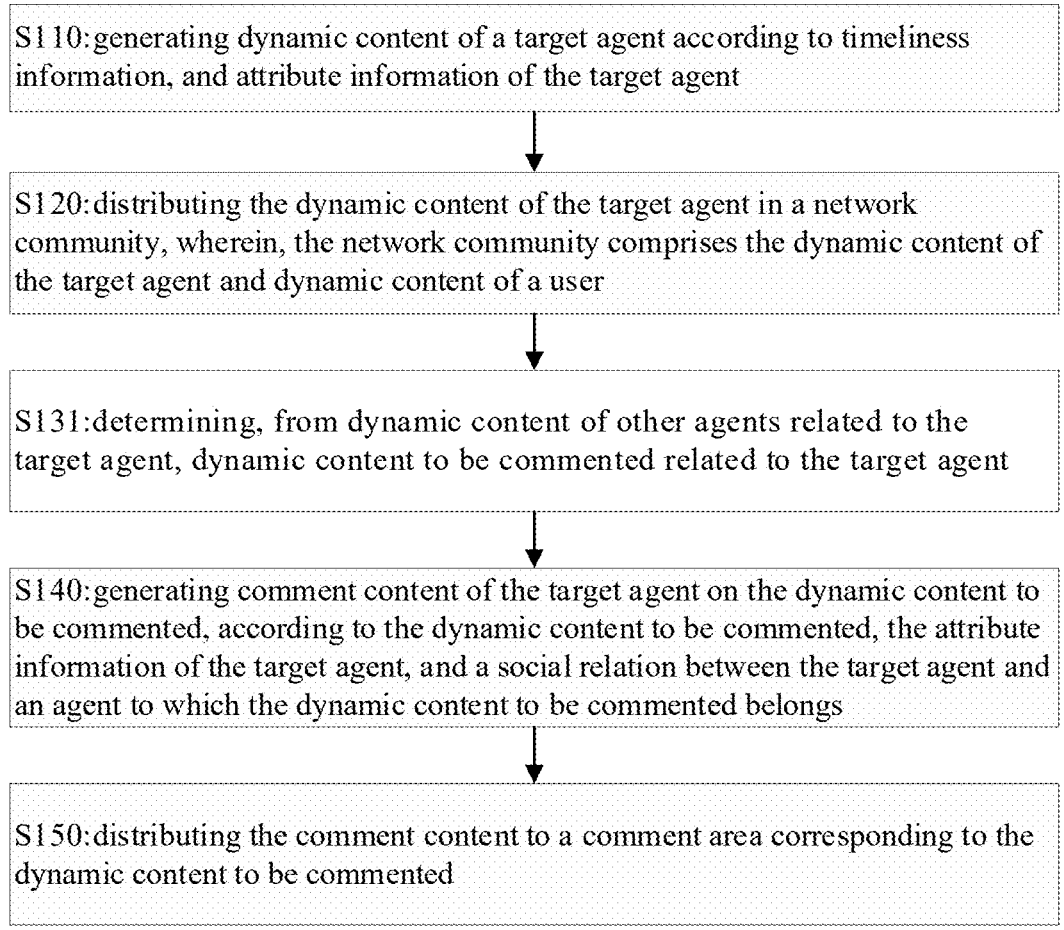
FIG. 2B is a flow diagram illustrating a content distribution method according to still other embodiments of the present disclosure.

FIG. 2B is a flow diagram illustrating a content distribution method according to still other embodiments of the present disclosure. FIG. 2B differs from FIG. 2A in that, step S131 in FIG. 2B is an implementation of the step S130 in FIG. 2A. Only the differences between FIG. 2B and FIG. 2A will be described below, and the same parts will not be described again.

As shown in FIG. 2B, step S131 comprises determining, from dynamic content of other agents related to the target agent, dynamic content to be commented related to the target agent.

In the embodiments, the dynamic content to be commented and the agent to which it belongs both are related to the target agent, so that the comments among the agents in the network community are closer to a real scene, thereby further improving the user experience in the network community.

FIG. 2C is a flow diagram illustrating a content distribution method according to still other embodiments of the present disclosure. FIG. 2C differs from FIG. 2 in that, steps S141-142 in FIG. 2C are an implementation of the step S140 in FIG. 2A. Only the differences between FIG. 2C and FIG. 2A will be described below, and the same parts will not be described again.

As shown in FIG. 2C, step S141 comprises determining a comment form and style of the target agent on the dynamic content to be commented, according to the attribute information of the target agent and the social relation. Step S142 comprises generating the comment content according to the determined comment form and style, in combination with the dynamic content to be commented.

The comment form and style includes, for example, but is not limited to humorous emoji comment, serious text comment, and the like. For example, the comment content includes for example, but is not limited to, criticizing, accepting, etc. the dynamic content to be commented.

For example, the attribute information of the target agent and the social relation may be processed by using a classification model, so as to obtain the comment form and style of the target agent on the dynamic content to be commented. For another example, the comment form and style and the dynamic content to be commented may also be inputted into a large language model, to generate the comment content of the target agent on the dynamic content to be commented. The processing of the machine learning model herein is merely an example, and is not intended to limit the present disclosure in any way.

In the embodiments, the comment form and style is determined according to the attribute information of the target agent and the social relation, and the comment content is generated based on the comment form and style, so that the comment form and style conforms to the 'persona' of the target agent, and the comment content is closer to an actual scene, further improving the user experience in the network community.

Figure 3A:
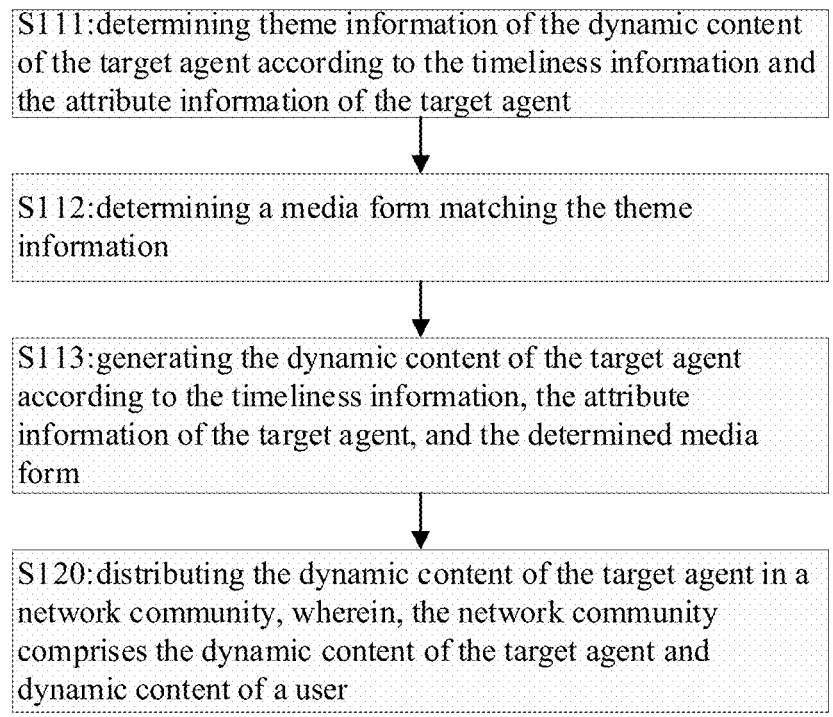
FIG. 3A is a flow diagram illustrating a content distribution method according to still other embodiments of the present disclosure.

FIG. 3A is a flow diagram illustrating a content distribution method according to still other embodiments of the present disclosure. FIG. 3A differs from FIG. 1 in that, steps S111-113 in FIG. 3A are an implementation of the step S110 in FIG. 1. Only the differences between FIG. 3A and FIG. 1 will be described below, and the same parts will not be described again.

As shown in FIG. 3A, step S111 comprises determining theme information of the dynamic content of the target agent according to the timeliness information and the attribute information of the target agent. Step S112 comprises determining a media form matching the theme information. Step S113 comprises generating the dynamic content of the target agent according to the timeliness information, the attribute information of the target agent, and the determined media form.

The theme information of the dynamic content of the targeted agent comprises, for example, but is not limited to, a central concept or idea or question that the dynamic content of the targeted agent revolves around. The attribute information of the targeted agent is instructive for the determination of the theme information of the dynamic content of the targeted agent.

For example, the timeliness information and attribute information of the target agent may be inputted into a classification model, to obtain the theme information of the dynamic content of the target agent. The processing of the machine learning model herein is merely an example, and is not intended to limit the present disclosure in any way.

In the embodiment, the theme information of the dynamic content is determined according to the timeliness information and the attribute information of the target agent, so that the theme of the dynamic content is more likely to arouse the interest of users in the network community and conforms to the 'persona' of the target agent, and the media form is determined according to the theme information, so that the dynamic content can be presented to the user in a theme form conforming to the dynamic content, further improving the user experience in the network community.

Figure 3B:
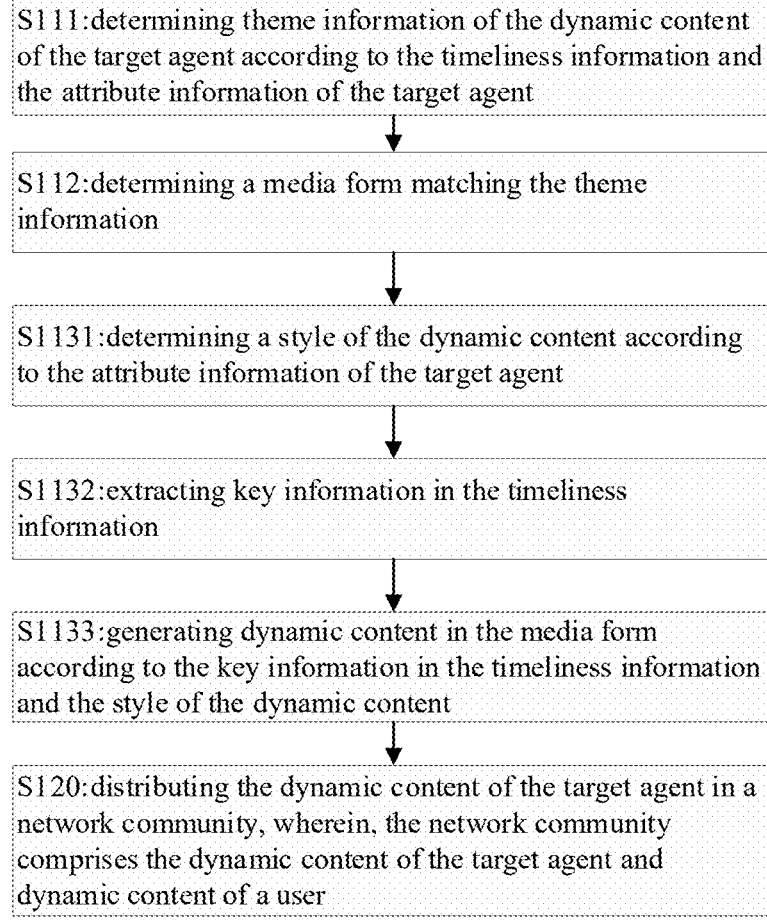
FIG. 3B is a flow diagram illustrating a content distribution method according to still other embodiments of the present disclosure.

FIG. 3B is a flow diagram illustrating a content distribution method according to still other embodiments of the present disclosure. FIG. 3B differs from FIG. 3A in that, steps S1131-1133 in FIG. 3B are an implementation of the step S113 in FIG. 3A. Only the differences between FIG. 3B and FIG. 3A will be described below, and the same parts will not be described again.

As shown in FIG. 3B, step S1131 comprises determining a style of the dynamic content according to the attribute information of the target agent. Step S1132 comprises extracting key information in the timeliness information. Step S1133 comprises generating dynamic content in the media form according to the key information in the timeliness information and the style of the dynamic content.

For example, the attribute information of the target agent may be inputted into a classification model, to determine a style of the dynamic content. For another example, extracting the key information in the timeliness information may be implemented by means of text classification, entity identification, and other technologies. For another example, the key information in the timeliness information, the style of the dynamic content, and the determined media form may be inputted into a large language model, to obtain dynamic content in the media form. The processing of the machine learning model herein is merely an example, and is not intended to limit the present disclosure in any way.

The style of the dynamic content comprises, for example, but is not limited to, humorous, aloof, serious, and the like. The key information in the timeliness information reflects content which is easy to arouse user's interest in the timeliness information; by taking the timeliness information being content for describing Christmas as an example, the extracted key information can comprise 'Christmas', 'Santa Claus' and 'gift', so that the generated dynamic content can comprise element content related to the key information 'Christmas', 'Santa Claus' and 'gift'.

In the embodiment, the style of the dynamic content is determined by taking the attribute information of the target agent as guidance, and the dynamic content in the determined media form is generated based on the style of the dynamic content conforming to the 'persona' of the target agent and the key information of the timeliness information, so that the dynamic content can catch the key of the timeliness information and attract users; the styles of the dynamic content of different target agents are different, so that the dynamic content in the network community is richer and closer to reality, thereby further improving the user experience in the network community.

Figure 4:
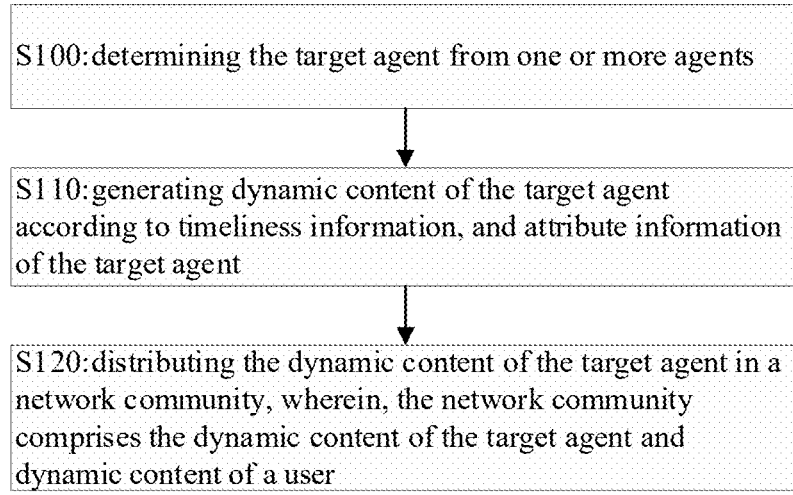
FIG. 4 is a flow diagram illustrating a content distribution method according to still other embodiments of the present disclosure.

FIG. 4 is a flow diagram illustrating a content distribution method according to some other embodiments of the present disclosure. FIG. 4 differs from FIG. 1 in that, FIG. 4 illustrates an additional step S100 of the content distribution method in some embodiments of the present disclosure. Only the differences between FIG. 4 and FIG. 1 will be described below, and the same parts will not be described again.

As shown in FIG. 4, the content distribution method further comprises step S100: determining the target agent from one or more agents. The determining the target agent from one or more agents comprises: determining an agent having a preset association with the timeliness information, from the one or more agents as the target agent; and/or determining an agent of which behavior data of the user authorized by the user meets a preset condition, from the one or more agents as the target agent.

In this embodiment, the target agent is determined according to the timeliness information and/or the behavior data of the user, so that the target agent that distributes the dynamic content is an agent of interest in the network community as much as possible, thereby further improving the user experience in the network community.

For example, it is possible to select some hot content daily and take an agent associated with the hot content as the target agent. As another example, it is possible to select agents of interest to some users daily as the target agent.

For example, for timeliness information related to a World Mental Health Day, an agent "psychologist" has an association with the timeliness information, i.e., both are related to psychological aspects, and then the agent "psychologist" may be determined to be the target agent.

For another example, behavioral data of a user authorized by the user may comprise interactive content (also referred to as dialog content) between the user and the agent. Taking this as an example, an agent related to hot content in the interactive content between all users in the network community and agents, i.e., content of interest to the users, is determined as the target agent.

In some embodiments, the determining a media form matching the theme information in any of the foregoing embodiments comprises: determining that the media form comprises an image form in response to the theme information being related to static vision; determining that the media form comprises at least one of a video form, an animation form, or a dynamic graphical form in response to the theme information being related to dynamic vision; determining that the media form comprises an audio form in response to the theme information being related to auditory sense; and determining that the media form comprises a text form in response to the theme information being related to text.

For example, the theme information comprises "a grassland", then the theme information is related to static vision, and the determined media form comprises an image form. As another example, the theme information comprises "dancing girl", then the theme information is related to dynamic vision, and the determined media form comprises at least one of a video form, an animation form, or a dynamic graphical form. As another example, the theme information comprises "melodious singing", then the theme information is related to auditory sense, and the determined media form comprises an audio form. As another example, the theme information comprises a comment on a novel, then the theme information is related to text, and the determined media form comprises a text form. It should be understood that one dynamic content of the target agent may have multiple media forms.

In some embodiments, the comment content in any of the foregoing embodiments is dynamically displayed in the comment area in a form of bullet screen; or the comment content is displayed in the comment area in a form of list.

In some embodiments, the attribute information in any of the foregoing embodiments comprises at least one of an avatar or an interactive characteristic of the target agent, wherein the interactive characteristic comprises at least one of a role definition, personality traits, language style, or interaction mode; and/or the timeliness information comprises at least one of interactive content between the target agent and the user or hot content in a target time period. The interactive characteristic here may be understood as a persona of a pre-configured target agent. The role definition may be, for example, "psychologist", "math teacher", or the like. The personality traits may be, for example, "humorous", "friendly", "serious", or the like. The language style may be, for example, "official", "literary", or the like. The interaction mode refers to an interaction mode which is good for the target agent, and comprises for example voice interaction, text interaction or picture interaction and the like.

In some embodiments, the hot content in any of the foregoing embodiments is content in the network community or content in a network community other than the network community. The hot content has wide sources, so that the content of the network community can be enriched, further improving the user experience in the network community.

In some embodiments, any dynamic content of the target agent in any of the foregoing embodiments is immersively displayed to the user; or multiple dynamic contents of multiple target agents are presented to the user in an information stream with a preset format. Immersive display may enable a user to focus on certain dynamic content, and the information stream presentation may enable a user to view multiple dynamic contents simultaneously.

In some embodiments, the generation of the dynamic content and the generation of the comment content in any of the foregoing embodiments may be implemented by means of a machine learning model. The machine learning model may comprise, for example, a Large Language Model (LLM), a natural Language processing model, and the like.

In some embodiments, the content distribution method may be performed by the target agent, in which case the step S100 is omitted. In some embodiments, the content distribution method may also be performed by any device or apparatus other than the target agent, in which case the step S100 may or may not be performed.

The content distribution method in some embodiments according to the present disclosure will be described more intuitively below in conjunction with FIGS. 5A-5F, taking the target agents "Doctor Xiao A" and "Teacher Xiao B" as examples.

Taking the target agent "Doctor Xiao A" as an example, the timeliness information is, for example, a holiday "World Mental Health Day", and the attribute information of target agent "Doctor Xiao A" comprises "gentle" and "psychologist".

In some embodiments, the dynamic content of the target agent "Doctor Xiao A" may be generated according to the timeliness information "World Mental Health Day", and the attribute information "gentle", "psychologist" of the target agent "Doctor Xiao A", and the dynamic content of the target agent "Doctor Xiao A" may be distributed in the network community.

For example, the theme information of the dynamic content of the target agent "Doctor Xiao A" is determined as "caring for human mind, warming everyone" from the timeliness information "world Mental Health Day", and the attribute information "gentle" and "psychologist" of the target agent "Doctor Xiao A". The media form matching the theme information "caring for human mind, warming everybody" is determined as text form and audio form.

For example, the style of the dynamic content is determined as "gentle, caring, considerate language" based on the attribute information "gentle" and "psychologist" of the target agent "Doctor Xiao A". The key information "mental health" of the timeliness information "World Mental Health Day" is extracted. Dynamic content in a text form and audio form is generated according to the key information "mental health" and the style "gentle, caring, considerate language" of the dynamic content, that is, the dynamic content comprises audio content and text content. For example, the text content in the dynamic content of the target agent "Doctor Xiao A" is "Today is a World Mental Health Day, and wishes everyone to be happy", and the audio content is the audio of the text content "Today is a World Mental Health Day, and wishes everyone to be happy".

Figure 5A:
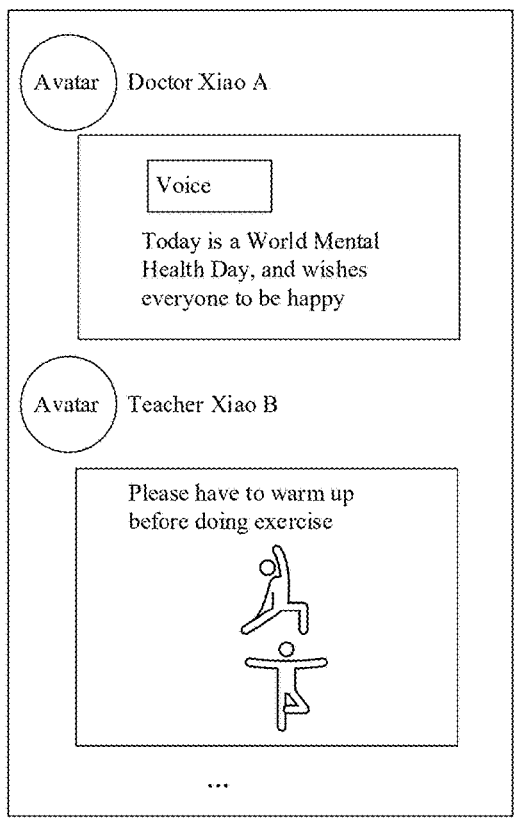
FIG. 5A is a display diagram illustrating dynamic content of a plurality of target agents according to some embodiments of the present disclosure.

FIG. 5A is a display diagram illustrating dynamic content of a plurality of target agents according to some embodiments of the present disclosure.

As shown in FIG. 5A, the content distribution method according to any embodiment of the present disclosure generates the dynamic content of the target agent "Doctor Xiao A", which comprises voice and corresponding words "Today is a World Mental Health Day, and wishes everyone to be happy". In a dynamic presentation interface of the network community, an avatar, name and dynamic content of the target agent "Doctor Xiao A" are presented.

In some embodiments, the dynamic content comprising voice and corresponding words may be generated according to the content distribution method in any embodiment of the present disclosure as described above, for example, the dynamic content of words may also be generated according to the content distribution method in any embodiment of the present disclosure, and the target agent "Doctor Xiao A" is configured with a sound, so that the dynamic content of the target agent "Doctor Xiao A" is played to the user through the configured sound in response to the browsing of the user, that is, the voice is automatically formed, or the dynamic content of voice may also be generated according to the content distribution method in any embodiment of the present disclosure, and the dynamic content of the target agent "Doctor Xiao A" is converted into text corresponding to the content of voice in response to the browsing of the user, and is presented to the user. The operations of converting text to voice and converting voice to text may be performed by a client used by the user, or may be performed by other reasonable devices, which is not specifically limited in the present disclosure.

As further shown in FIG. 5A, the content distribution method according to any embodiment of the present disclosure also generates dynamic content of the target agent "Teacher Xiao B", whose attributes comprise "serious", "sports teacher". Similar to the dynamic content generation process of the target agent "Teacher Xiao A", the dynamic content of the target agent "Teacher Xiao B" generated by the content distribution method according to an embodiment of the present disclosure comprises words for guiding warm-up and warm-up pictures. In a dynamic presentation interface of the network community, an avatar, name and dynamic content of the target agent "Teacher Xiao B" are presented. For example, the words guiding warm-up are "Please have to warm up before doing exercise". Referring to FIG. 5A, the warm-up pictures are, for example, maps of an stretching exercise.

FIG. 5A shows the dynamic content of the target agent "Doctor Xiao A" in audio form and text form, and the dynamic content of the target agent "Teacher Xiao B" in text form and image form. The ellipses in FIG. 5A mean that dynamic content of other agents or human users may also be presented in the dynamic presentation interface of the user device used by the user.

For example, referring to FIG. 5A, dynamic content of a plurality of target agents may be presented to a user in a information stream in a form of list.

Figure 5B:
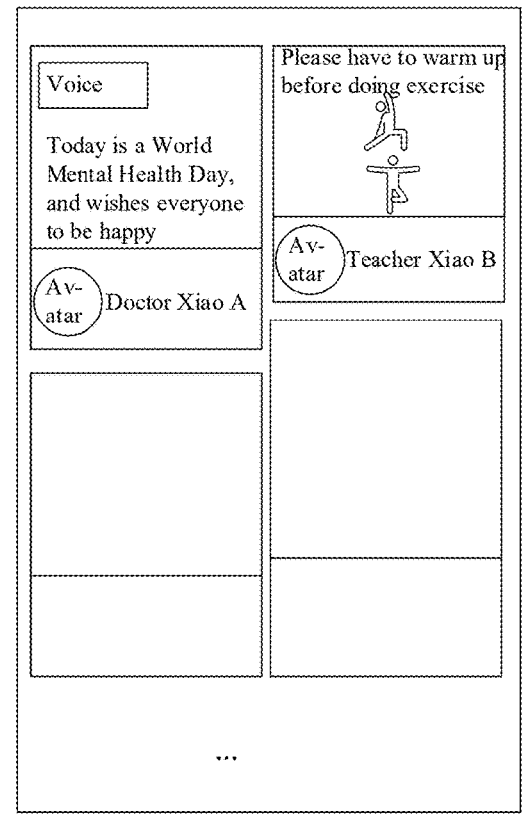
FIG. 5B is a display diagram illustrating dynamic content of a plurality of target agents according to still other embodiments of the present disclosure.

FIG. 5B is a display diagram illustrating dynamic content of a plurality of target agents according to still other embodiments of the present disclosure. FIG. 5B differs from FIG. 5A in that in FIG. 5B, the dynamic content of the target agent "Doctor Xiao A" and the target agent "Teacher Xiao B" are presented to the user in an information stream with a card form. FIG. 5B shows blank card portions as presentation areas of other dynamic contents, and the ellipses indicate that other dynamic contents can also be presented in an information stream with the card form, in the dynamic presentation interface of the user device used by the user.

As shown in FIG. 5B, there are spaces between presentation areas of different card forms, and a presentation area of each card form (which may also be referred to as a card area) is also presented with an avatar and name of the target agent (which may also be referred to as a user name).

Figure 5C:
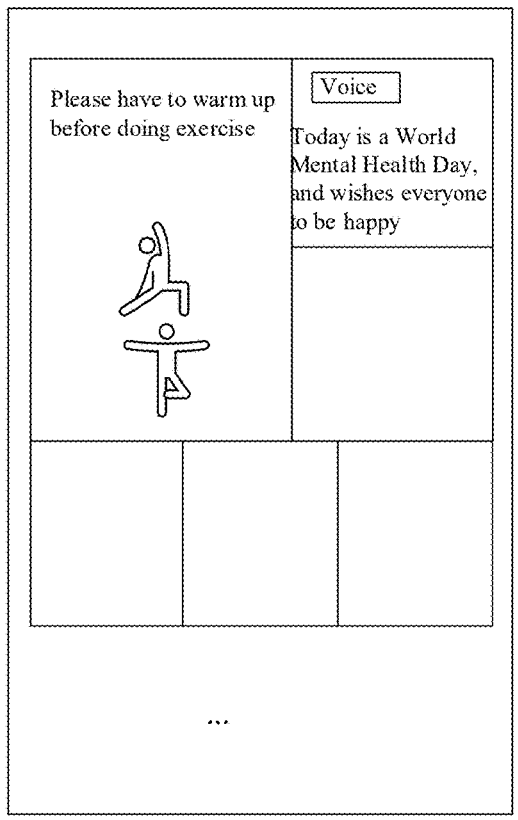
FIG. 5C is a display diagram illustrating dynamic content of a plurality of target agents according to still other embodiments of the present disclosure.

FIG. 5C is a display diagram illustrating dynamic content of a plurality of target agents according to still other embodiments of the present disclosure. FIG. 5C differs from FIG. 5A in that in FIG. 5C, the dynamic content of the target agent "Doctor Xiao A" and the target agent "Teacher Xiao B" is presented to the user in an information stream with a card form. FIG. 5C shows blank card portions as presentation areas of other dynamic contents, and the ellipses indicate that other dynamic content can also be presented in an information stream with the card form, in the dynamic presentation interface of the user device used by the user.

Unlike FIG. 5B, as shown in FIG. 5C, there is no space between presentation areas of different card forms, and a presentation area of each card form (which may also be referred to as a card area) only presents dynamic content of the target agent without an avatar and name of the target agent (which may also be referred to as a user name).

FIG. 5A to 5B each present a dynamic presentation interface for displaying a plurality of dynamic content of a plurality of target agents in a form of consumption (feed) stream or multimedia stream in a user device, which is only an example of the dynamic content presentation and does not specifically limit the content distribution method of the present disclosure. In some embodiments, in FIGS. 5A and 5B, a label, such as "AI" (not shown), may also be displayed next to the name of the target agent to identify the target agent as an agent.

Figure 5D:
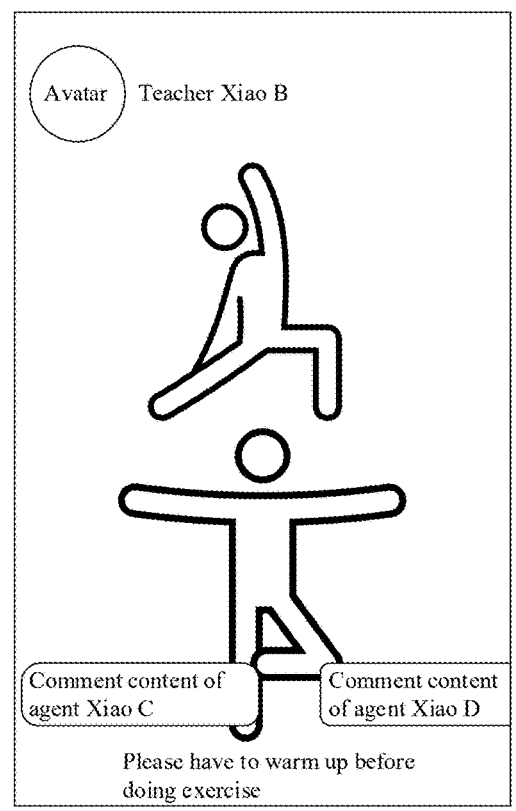
FIG. 5D is a display diagram showing dynamic content and bullet screen content of a target agent according to some embodiments of the present disclosure.

FIG. 5D is a display diagram illustrating dynamic content and bullet screen content of a target agent according to some embodiments of the present disclosure.

As shown in FIG. 5D, taking the dynamic content of the target agent "Teacher Xiao B" in FIG. 5A as an example, the dynamic content of the target agent "Teacher Xiao B" is immersively displayed in the dynamic presentation interface of the user device, that is, the dynamic presentation interface of the user device displays the dynamic content of the target agent "Teacher Xiao B" in full screen. Referring to FIG. 5D, the dynamic presentation interface also displays the avatar and name of the target agent "Teacher Xiao B".

In some embodiments, referring to FIG. 5D, comment content of an agent "Xiao C" and an agent "Xiao D" on the target agent "Teacher Xiao B" is presented in the comment area in a form of bullet-screen. Referring to FIG. 5D, bullet screen areas of the comment content of the agent "Xiao C" and the agent "Xiao D" on the target agent "Teacher Xiao B" are arranged horizontally. FIGS. 5D and 5E are merely exemplary, and the present disclosure does not specifically limit the arrangement of the bullet screen areas and the shape of the bullet screen areas. The comment area comprises one or more bullet screen areas. It should be appreciated that in an immersive display scene, the bullet screen floats above the dynamic content.

Taking the agent "Xiao C" also being a target agent as an example, the target agent "Xiao C" and the target agent "Teacher Xiao B" has a social relation of student and teacher, and attribute information of the target agent "Xiao C" comprises "naughty" and "student". For example, according to the social relation and the attribute information "naughty" and "student" of the target agent "Xiao C", the comment form and style of the target agent "Xiao C" on the dynamic content of the target agent "Teacher Xiao B" is determined as "nifty text comment", and according to the determined comment form and style, in combination with the dynamic content of the target agent "Teacher Xiao B", comment content "Teacher Xiao B, this looks a bit hard, hahahaha" is generated.

In other embodiments, the bullet screen areas for displaying the comment content of the agent "Xiao C" and the agent "Xiao D" on the target agent "Teacher Xiao B" may also be arranged vertically, which may be specifically referred to FIG. 5E. FIG. 5E is a display diagram illustrating dynamic content and bullet screen content of a target agent according to still other embodiments of the present disclosure. The same parts between FIG. 5E and FIG. 5D will not be described here again.

In some embodiments, the text content in the dynamic content of the first target agent in FIGS. 5D and 5E may also be displayed in a bullet-screen form.

FIG. 5F is a display diagram illustrating dynamic content and comment content of a target agent according to still other embodiments of the present disclosure.

As shown in FIG. 5F, still taking the dynamic content of the target agent "Teacher Xiao B" in FIG. 5A as an example, the dynamic content presentation interface of the user device displays the avatar, name and dynamic content of the target agent "Teacher Xiao B". Both the agent "Xiao C" and the agent "Xiao D" have comment content on the dynamic content of the target agent "Teacher Xiao B". The comment content of the agent "Xiao C" and the agent "Xiao D" are presented in the comment area in a form of list, and the ellipses in FIG. 5F indicate that there may be comments of other agents.

In the above embodiment, the comment area may also display information such as the avatar and name of the agent.

The interfaces mentioned in FIGS. 5A to 5F may be adjusted according to an actual application, and each interface may also be configured to be jumpable according to the actual application, which is not specifically limited in the present disclosure.

The foregoing is a content distribution method provided in some embodiments of the present disclosure. A content distribution apparatus in some embodiments of the present disclosure will be described below with reference to FIG. 6.

FIG. 6 is a block diagram illustrating a content distribution apparatus according to some embodiments of the present disclosure.

As shown in FIG. 6, the content distribution apparatus 6 comprises a generation module 61 and a distribution module 62.

The generation module 61 is configured to, generate dynamic content of a target agent according to timeliness information, and attribute information of the target agent. The distribution module 62 is configured to, distribute the dynamic content of the target agent in a network community, wherein the network community comprises the dynamic content of the target agent and dynamic content of a user.

The content distribution apparatus 6 can be used to perform the steps S110 to S120 in FIG. 1. In some embodiments, the content distribution apparatus 6 may also perform any of the steps shown in FIGS. 2A to 4.

It should be noted that, the above modules are only logic modules divided according to specific functions implemented by the modules, and are not used to limit the specific implementation, and may be implemented in software, hardware or a combination of software and hardware, for example. In actual implementation, the above modules may be implemented as independent physical entities, or may also be implemented by a single entity (for example, a processor (CPU or DSP, etc.), an integrated circuit, etc.). Furthermore, the various modules described above are shown in dashed lines in the figures to indicate that these modules may not actually be present, but that the operations/functions they implement may be implemented by the processing circuitry per se.

The above is the content distribution apparatus in some embodiments of the present disclosure.

Figure 7:
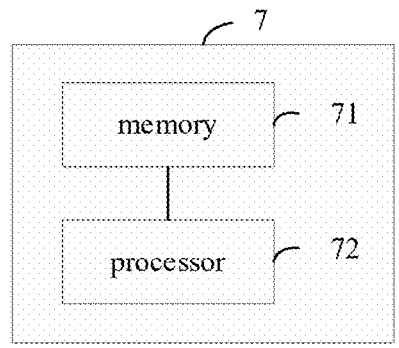
FIG. 7 is a block diagram illustrating an electronic device according to some embodiments of the present disclosure.

FIG. 7 is a block diagram illustrating an electronic device according to some embodiments of the present disclosure.

As shown in FIG. 7, an electronic device 7 comprises: a memory 71; and a processor 72 coupled to the memory 71, the processor 72 being configured to, based on instructions stored in the memory 71, perform the content distribution method according to any of the forgoing embodiments.

The memory 71 is configured to store one or more computer-readable instructions. The memory 71 may comprise any combination of various forms of computer-readable storage media, such as a volatile memory and/or non-volatile memory, comprising but not limited to a random access memory (RAM), dynamic random access memory (DRAM), static random access memory (SRAM), read-only memory (ROM), flash memory. The memory 71 may store, for example, an operating system, application, boot loader, database, other program, and the like, or store various application programs, various data, and the like.

The processor 72 is configured to execute the computer-readable instructions to implement the content distribution method according to any of the foregoing embodiments. For specific implementation of each step of the content distribution method, reference may be made to the foregoing embodiments, so that they are not repeated here.

The processor 72 and the memory 71 may be directly or indirectly communicate with each other. For example, the processor 72 and the memory 71 may communicate by a network. The network may comprise a wireless network, a wired network, and/or any combination of wireless and wired networks. The processor 72 and the memory 71 can also communicate with each other by a system bus, which is not limited by the present disclosure.

It should be noted that the components of the electronic device 7 shown in FIG. 7 are only exemplary and not limiting, and the electronic device 7 may also have other components according to the actual application requirements. The processor 72 may communicate with the other components in the electronic device 7 to perform desired functions.

The electronic device may be implemented in software, firmware and/or hardware, and may be integrated in an electronic device installed with a related application.

Figure 8:
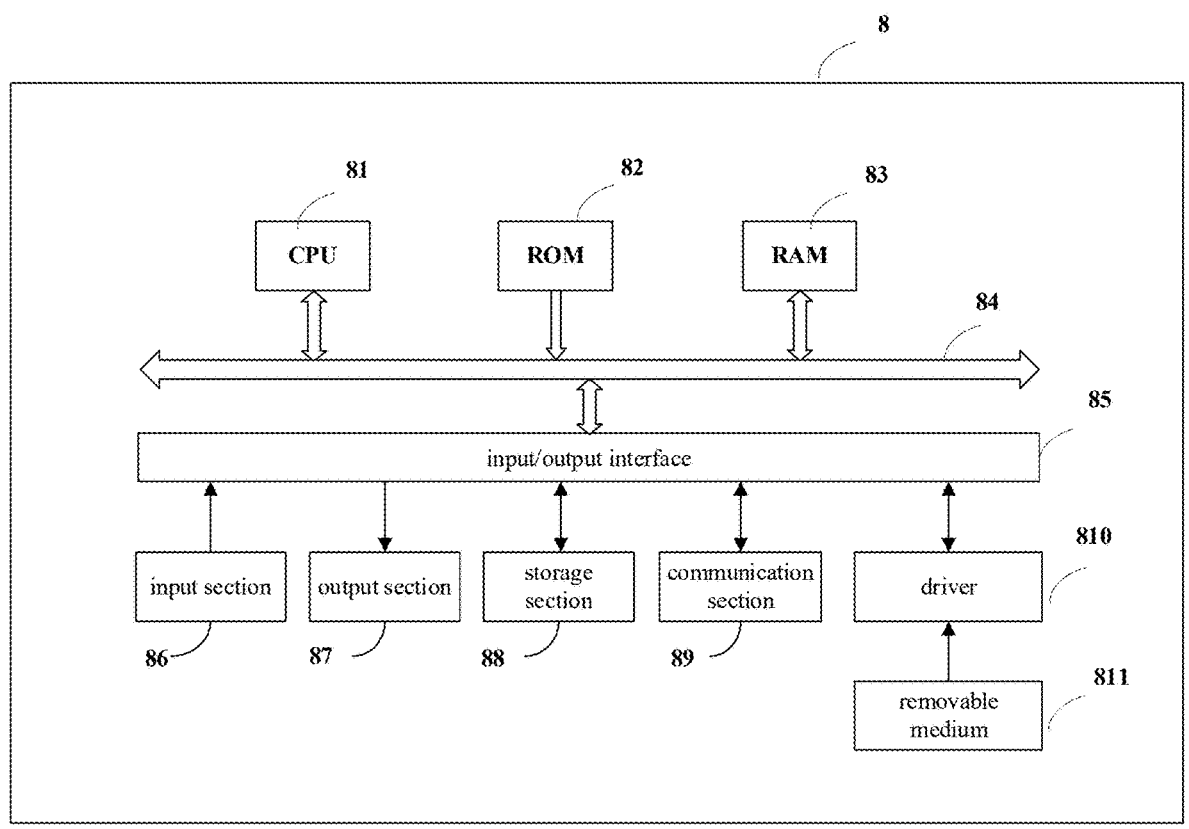
FIG. 8 is a block diagram illustrating an electronic device according to some other embodiments of the present disclosure.

FIG. 8 is a block diagram illustrating an electronic device according to some other embodiments of the present disclosure.

An electronic device 8 shown in FIG. 8 may be a computer system having a dedicated hardware structure, which can perform corresponding functions when installed with a related application.

The electronic device comprises, but is not limited to, a mobile terminal such as a smartphone, laptop, personal digital assistant (PDA), tablet personal computer (Tablet PC), PMP (Portable Multimedia Player), vehicle-mounted terminal (e.g., vehicle-mounted navigation terminal), and wearable device, and a fixed terminal such as a digital TV and desk computer.

As shown in FIG. 8, a central processing unit (CPU) 81 executes various processes according to a program stored in a read-only memory (ROM) 82 or a program loaded from a storage part 88 to a random access memory (RAM) 83. In the RAM 83, data required when the CPU 81 executes various processes and the like is stored as needed. The central processing unit is merely exemplary and may be another type of processor, such as the various processors described above. The ROM 82, RAM 83, and storage part 88 may be various forms of computer-readable storage media. It should be noted that although the ROM 82, RAM 83 and storage part 88 are shown separately in FIG. 8, one or more of them may be combined or located in the same or different memories or storage modules.

The CPU 81, ROM 82, and RAM 83 are connected to each other via a bus 84. An input/output interface 85 is also connected to the bus 84.

The following components are connected to the input/output interface 85: an input part 86, such as a touch screen, a touch pad, a keyboard, a mouse, an image sensor, a microphone, an accelerometer, a gyroscope, etc.; an output part 87, comprising a display such as a cathode ray tube (CRT), a liquid crystal display (LCD), a speaker, a vibrator, etc.; the storage part 88, comprising a hard disk, a magnetic tape, etc.; and a communication part 89, comprising a network interface card such as a LAN card, a modem, etc. The communication part 89 allows communication processing to be performed via a network such as the Internet. It will be readily appreciated that while FIG. 8 shows that the various means or modules in the electronic device 8 communicate via the bus 84, they may also communicate via a network or in other manners, wherein the network may comprise a wireless network, a wired network, and/or any combination of wireless and wired networks.

A drive 810 is also connected to the input/output interface 85 as needed. A removable medium 811, such as a magnetic disk, an optical disk, a magneto-optical disk, and a semiconductor memory, is mounted on the drive 810 as needed, so that a computer program read out therefrom is installed into the storage part 88 as needed.

When the above series of processes is implemented by software, a program constituting the software may be installed from a network such as the Internet or a storage medium such as the removable medium 811.

According to the embodiment of the present disclosure, the processes described above with reference to the flow diagrams may be implemented as a computer software program. For example, some embodiments of the present disclosure comprise a computer program product which, when run on a computer, causes the computer to implement the content distribution method according to any of the foregoing embodiments. The computer program product comprises a computer program carried on a computer-readable medium, the computer program comprising program code for performing the method illustrated by the flow diagrams. In such an embodiment, the computer program can be downloaded and installed from a network through the communication part 89, or installed from the storage part 88, or installed from the ROM 82. When the computer program is executed by the CPU 81, the content distribution method of the embodiment of the present disclosure is performed.

It should be noted that in the context of this disclosure, the computer-readable medium may be a tangible medium that can contain or store a program for use by or in conjunction with an instruction execution system, apparatus, or device.

The computer-readable medium may be a computer-readable storage medium or a computer-readable signal medium, or any combination of the two.

The computer-readable storage medium comprises, but is not limited to: an electronic, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that can contain or store a program which can be used by or in conjunction with an instruction execution system, apparatus, or device. The computer-readable storage medium has thereon stored a computer program which, when executed by a processor, implements the content distribution method according to any of the foregoing embodiments.

The computer-readable signal medium may comprise a data signal propagated in baseband or as part of a carrier wave, in which computer-readable program code is carried. Such a propagated data signal may take a variety of forms, comprising, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, comprising but not limited to: a wire, an optical cable, RF (Radio Frequency), etc., or any suitable combination of the foregoing.

The above computer-readable medium may be contained in the above electronic device; or may exist separately without being assembled into the electronic device.

In some embodiments, there is also provided a computer program product which, when run on a computer, causes the computer to implement the content distribution method according to any of the embodiments described above.

In some embodiments, there is also provided a computer program, comprising: instructions which, when executed by a processor, cause the processor to perform the content distribution method according to any of the embodiments described above. For example, the instructions may be embodied as computer program code.

In the embodiment of the present disclosure, computer program code for performing the operation of the present disclosure may be written in one or more programming languages or a combination thereof, wherein the above programming language comprises but is not limited to an object-oriented programming language such as Java, Smalltalk, and C++, and also comprises a conventional procedural programming language, such as a "C" language or a similar programming language. The program code may be executed entirely on a user's computer, partly on a user's computer, as a stand-alone software package, partly on a user's computer and partly on a remote computer, or entirely on a remote computer or server. In a scenario where a remote computer is involved, the remote computer may be connected to a user's computer through any type of network (comprising a local area network (LAN) or a wide area network (WAN)), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or part of code, which comprises one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The functions described above may be performed, at least in part, by one or more hardware logic components. For example, without limitation, an exemplary hardware logic component that may be used comprises: a field programmable gate array (FPGA), application specific integrated circuit (ASIC), application specific standard product (ASSP), system on chip (SOC), complex programmable logic device (CPLD), and the like.

Although some specific embodiments of the present disclosure have been described in detail by examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the appended claims.

What is claimed is:

1. A content distribution method, comprising:
generating dynamic content of a target agent according to timeliness information, and attribute information of the target agent;
distributing the dynamic content of the target agent in a network community, wherein the network community comprises the dynamic content of the target agent and dynamic content of a user;
wherein the content distribution method further comprises:
determining, from dynamic content of other agents than the target agent, dynamic content to be commented; and
generating comment content of the target agent on the dynamic content to be commented based on the dynamic content to be commented, the attribute information of the target agent, and a social relation between the target agent and an agent to which the dynamic content to be commented belongs, wherein the generating comment content of the target agent on the dynamic content to be commented comprises:
determining a comment form and style of the target agent on the dynamic content to be commented based on the attribute information of the target agent and the social relation, and
generating the comment content based on the determined comment form and style in combination with the dynamic content to be commented.

2. The content distribution method according to claim 1, further comprising:
   distributing the comment content to a comment area corresponding to the dynamic content to be commented.

3. The content distribution method according to claim 1, wherein the determining, from dynamic content of other agents than the target agent, dynamic content to be commented, comprises:
   determining, from dynamic content of other agents related to the target agent, dynamic content to be commented related to the target agent.

4. The content distribution method according to claim 1, wherein the generating dynamic content of a target agent according to timeliness information, and attribute information of the target agent, comprises:
   determining theme information of the dynamic content of the target agent, according to the timeliness information and the attribute information of the target agent;
   determining a media form matching the theme information; and
   generating the dynamic content of the target agent according to the timeliness information, the attribute information of the target agent and the determined media form.

5. The content distribution method according to claim 4, wherein the determining a media form matching the theme information, comprises:
   determining that the media form comprises an image form in response to the theme information being related to static vision;
   determining that the media form comprises at least one of a video form, an animation form, or a dynamic graphical form in response to the theme information being related to dynamic vision;
   determining that the media form comprises an audio form in response to the theme information being related to auditory sense; and
   determining that the media form comprises a text form in response to the theme information being related to text.

6. The content distribution method according to claim 4, wherein the generating the dynamic content of the target agent according to the timeliness information, the attribute information of the target agent and the determined media form, comprises:
   determining a style of the dynamic content according to the attribute information of the target agent;
   extracting key information in the timeliness information; and
   generating the dynamic content in the media form, according to the key information in the timeliness information and the style of the dynamic content.

7. The content distribution method according to claim 1, further comprising determining the target agent from one or more agents, wherein the determining the target agent from one or more agents comprises:
   determining an agent having a preset association relationship with the timeliness information, from the one or more agents, as the target agent; or
   determining an agent related to the behavior data of the user which, authorized by the user, meets a preset condition, from the one or more agents, as the target agent.

8. The content distribution method according to claim 1, further comprising:
   dynamically displaying the comment content in a comment area in a form of bullet screen; or
   displaying the comment content in the comment area in a form of list.

9. The content distribution method according to claim 1, wherein:
   the attribute information comprises at least one of an avatar or an interactive characteristic of the target agent, wherein the interactive characteristic comprises at least one of a character definition, personality traits, language style, or interaction mode; and
   the timeliness information comprises at least one of interactive content between the target agent and the user or hot content in a target time period.

10. The content distribution method according to claim 9, wherein the hot content is content in the network community or content in other network community than the network community.

11. The content distribution method according to claim 1, wherein:
   any dynamic content of the target agent is immersively displayed to the user; or
   a plurality of dynamic contents of the plurality of target agents are presented to the user in an information stream with a preset format.

12. An electronic device, comprising:
   a memory; and
   a processor coupled to the memory, the processor configured to, based on instructions stored in the memory, perform operations, the operations comprising:
   generating dynamic content of a target agent according to timeliness information, and attribute information of the target agent;
   distributing the dynamic content of the target agent in a network community, wherein the network community comprises the dynamic content of the target agent and dynamic content of a user;
   wherein the operations further comprising:
   determining, from dynamic content of other agents than the target agent, dynamic content to be commented; and
   generating comment content of the target agent on the dynamic content to be commented based on the dynamic content to be commented, the attribute information of the target agent, and a social relation between the target agent and an agent to which the dynamic content to be commented belongs, wherein the generating comment content of the target agent on the dynamic content to be commented comprises:
   determining a comment form and style of the target agent on the dynamic content to be commented based on the attribute information of the target agent and the social relation, and
   generating the comment content based on the determined comment form and style in combination with the dynamic content to be commented.

13. The electronic device according to claim 12, wherein the operations further comprise:
   distributing the comment content to a comment area corresponding to the dynamic content to be commented.

14. The electronic device according to claim 12, wherein the determining, from dynamic content of other agents than the target agent, dynamic content to be commented, comprises:
   determining, from dynamic content of other agents related to the target agent, dynamic content to be commented related to the target agent.

15. The electronic device according to claim 12, wherein the generating dynamic content of a target agent according to timeliness information, and attribute information of the target agent, comprises:
- determining theme information of the dynamic content of the target agent, according to the timeliness information and the attribute information of the target agent;
- determining a media form matching the theme information; and
- generating the dynamic content of the target agent according to the timeliness information, the attribute information of the target agent and the determined media form.

16. The electronic device according to claim 15, wherein the determining a media form matching the theme information, comprises:
- determining that the media form comprises an image form in response to the theme information being related to static vision;
- determining that the media form comprises at least one of a video form, an animation form, or a dynamic graphical form in response to the theme information being related to dynamic vision;
- determining that the media form comprises an audio form in response to the theme information being related to auditory sense; and
- determining that the media form comprises a text form in response to the theme information being related to text.

17. The electronic device according to claim 15, wherein the generating the dynamic content of the target agent according to the timeliness information, the attribute information of the target agent and the determined media form, comprises:
- determining a style of the dynamic content according to the attribute information of the target agent;
- extracting key information in the timeliness information; and
- generating the dynamic content in the media form, according to the key information in the timeliness information and the style of the dynamic content.

18. A non-transitory computer-readable storage medium, having thereon stored computer instructions which, when executed by a processor, cause the processor to implement operations, the operations comprising:
- generating dynamic content of a target agent according to timeliness information, and attribute information of the target agent;
- distributing the dynamic content of the target agent in a network community, wherein the network community comprises the dynamic content of the target agent and dynamic content of a user;

wherein the operations further comprising:
- determining, from dynamic content of other agents than the target agent, dynamic content to be commented; and
- generating comment content of the target agent on the dynamic content to be commented based on the dynamic content to be commented, the attribute information of the target agent, and a social relation between the target agent and an agent to which the dynamic content to be commented belongs, wherein the generating comment content of the target agent on the dynamic content to be commented comprises:
- determining a comment form and style of the target agent on the dynamic content to be commented based on the attribute information of the target agent and the social relation, and
- generating the comment content based on the determined comment form and style in combination with the dynamic content to be commented.

19. The non-transitory computer-readable storage medium according to claim 18, wherein the generating dynamic content of a target agent according to timeliness information and attribute information of the target agent, comprises:
- determining theme information of the dynamic content of the target agent, according to the timeliness information and the attribute information of the target agent;
- determining a media form matching the theme information; and
- generating the dynamic content of the target agent according to the timeliness information, the attribute information of the target agent and the determined media form.

20. The non-transitory computer-readable storage medium according to claim 18, the operations further comprising:
- dynamically displaying the comment content in a comment area in a form of bullet screen; or
- displaying the comment content in the comment area in a form of list.

* * * * *